UNITED STATES PATENT OFFICE.

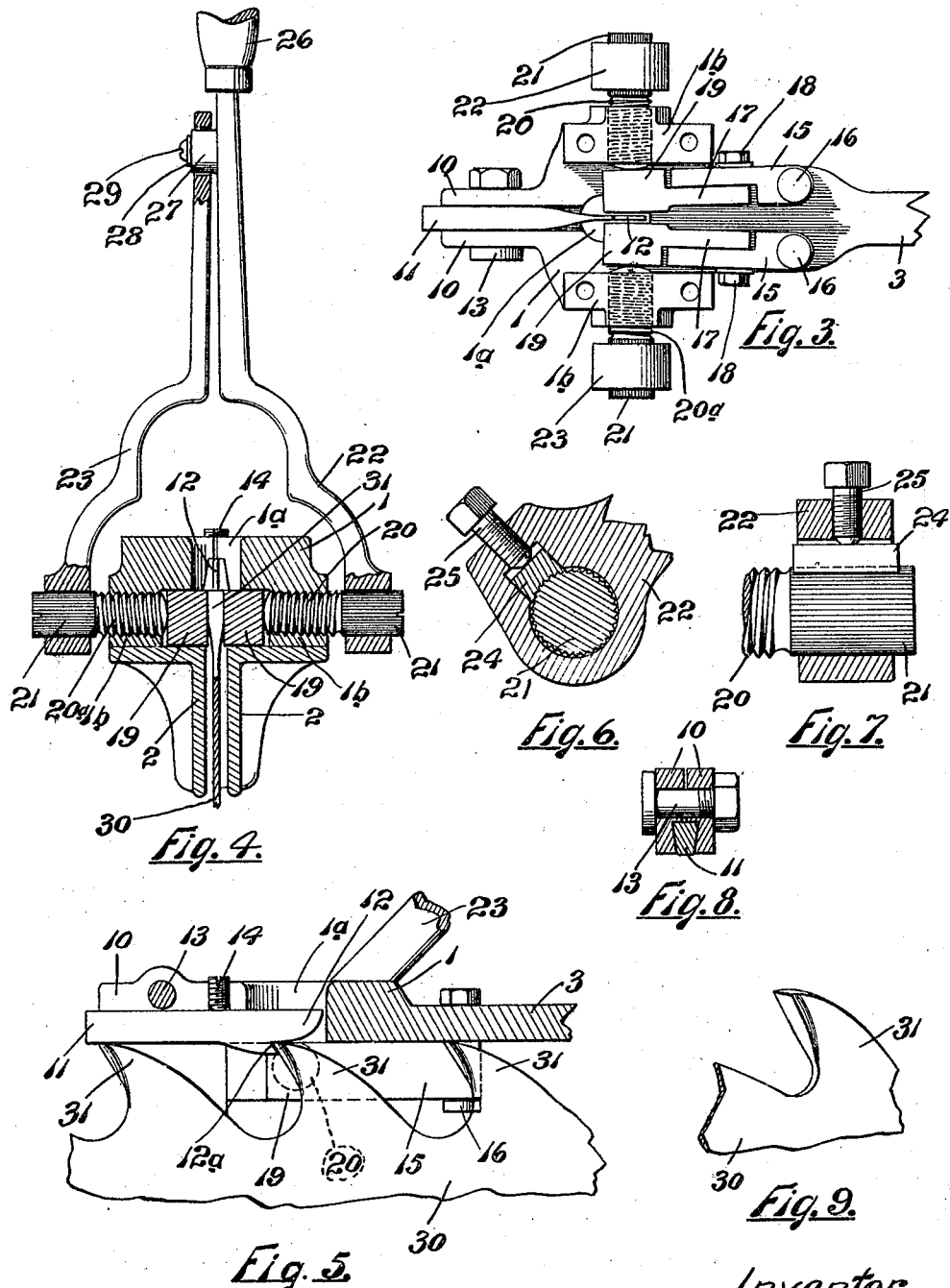

JOHN P. HEDSTROM, OF BIG RAPIDS, MICHIGAN, ASSIGNOR TO MACHINERY COMPANY OF AMERICA, OF BIG RAPIDS, MICHIGAN, A CORPORATION OF MICHIGAN.

SAW-TOOTH SHAPER.

1,401,695.   Specification of Letters Patent.   Patented Dec. 27, 1921.

Application filed June 28, 1920. Serial No. 392,310.

*To all whom it may concern:*

Be it known that I, JOHN P. HEDSTROM, a citizen of the United States of America, residing at Big Rapids, in the county of Mecosta and State of Michigan, have invented certain new and useful Improvements in Saw-Tooth Shapers; and I do hereby declare the following to be a full, clear, and exact description of the invention, such as will enable others skilled in the art to which it appertains to make and use the same.

This invention relates to a saw tooth shaper. After the teeth of a saw have been swaged it is desirable to shape the same so that all shall have the same shape and form, the operation of swaging ordinarily leaving the teeth uneven as to shape and form. It is a primary object and purpose of the present invention to make a shaper for saw teeth which may be applied to one tooth after another on a saw the teeth of which have been swaged, and operate the same to engage the teeth and press and form them to desired shape so that when the shaping operation on all of the teeth has been accomplished, all of the teeth of the saw are uniform in shape. A further object of the invention is to make a tool of this character which is of novel construction, one which is durable and one which is particularly efficient to accomplish the work it is designed to do. The novel constructions and arrangements of parts for attaining these ends will appear fully and in detail from the following description, taken in connection with the accompanying drawings, in which, Figure 1 is a side elevation of the saw tooth shaper and showing the same applied to a saw.

Fig. 3 is a fragmentary under plan view of the shaper.

Fig. 4 is a vertical section taken transversely through the shaper at the point where the operation on the saw tooth takes place.

Fig. 5 is a fragmentary longitudinal section through the shaper showing its operative relation to a saw tooth in the operation of shaping the same.

Fig. 6 is a vertical section illustrating the connection of the operating handles to the die operating screws.

Fig. 7 is a longitudinal section therethrough,

Fig. 8 is a transverse section through the shaper adjacent one end thereof, and

Fig. 9 is a perspective view of a saw tooth showing the upsetting thereof adjacent its point which has to be uniformly shaped in all the teeth.

Like reference characters refer to like parts in the different figures of the drawings.

Figure 1:
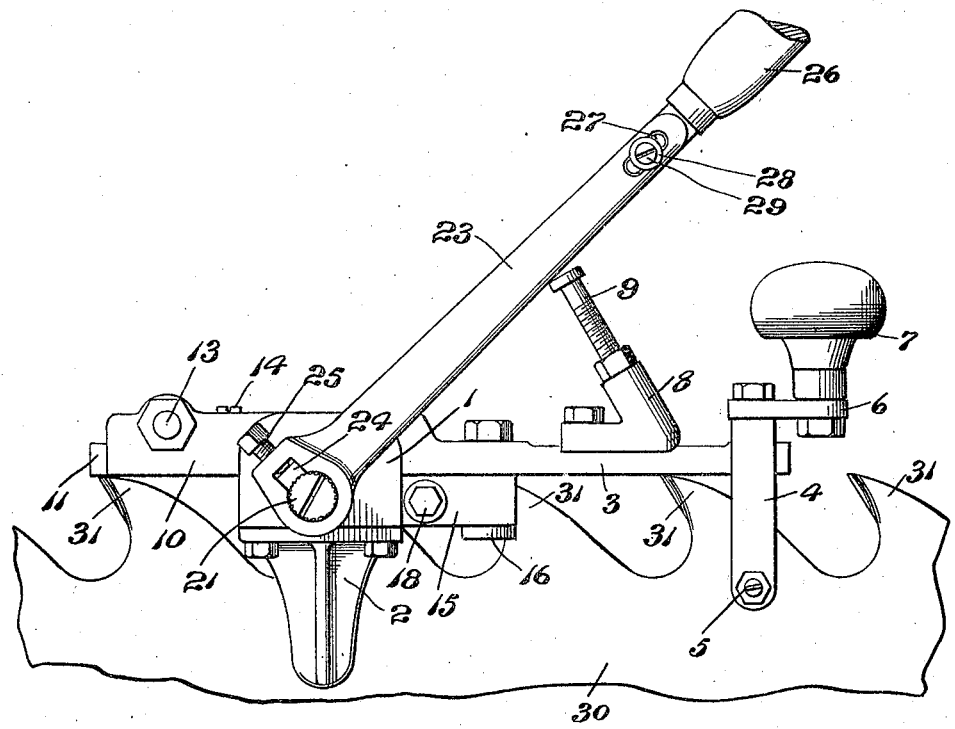
Figure 2:
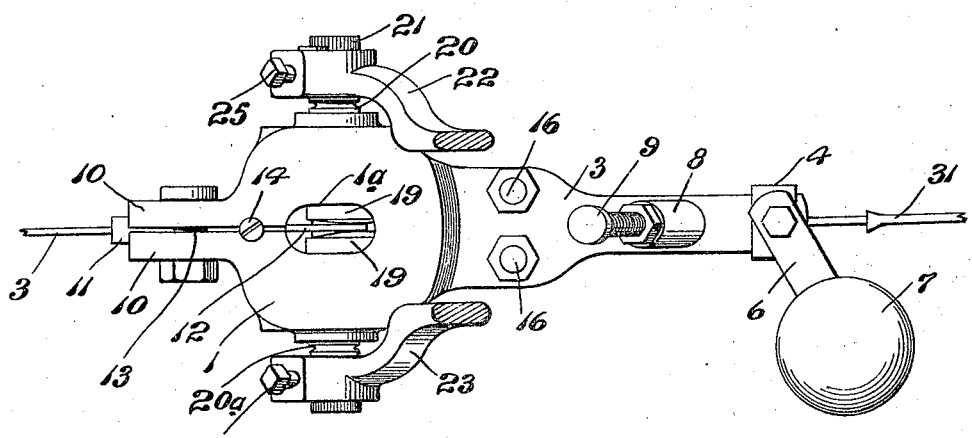
Fig. 2 is a plan view thereof, parts of the operating handles being broken away.

In the construction of the shaper a main or body member 1 is provided through which a vertical opening $1^a$ is made and which at each side is formed with a depending portion $1^b$. From one end a bar 3 integral with the member 1 extends, the same at its free end being equipped with a U-shaped stirrup having depending legs 4 adapted to go one at each side of a saw, and through which at their lower ends screws 5 pass, the same being adjustable so as to bring the inner ends thereof as close together as desired to engage against opposite sides of the saw. An arm 6 is connected to the upper end of the stirrup and carries a handle 7 at its outer free end which may be grasped by the hand to move the tool to different positions on the saw. Brackets 2 are attached to the member 1 below each side $1^b$ and are spaced far enough apart for the free entrance of the saw. A support 8 is attached to the bar 3 on its upper side into which an adjustable stop 9 is threaded, the same serving to limit the movement of the operating handles as will later appear.

From the opposite end of the member 1 two arms 10 extend being slightly spaced apart and carrying a block 11 between them which at its inner end is narrowed, the same coming directly under the opening $1^a$ in the body member 1. This block is adjustably secured in place between the arms 10 by a set screw 13 and an adjusting screw 14 threads downwardly against the upper side of the narrowed portion 12 a distance from the end thereof, serving to adjust the same in an up or down direction as desired, this adjustment being limited in scope but sufficient for all practical purposes.

Two bars 15 are pivotally mounted at their ends at 16 on the under side of the member 1, being disposed in parallelism and extending toward the opening 1ᵃ in member 1. To each of the bars 15 a bar 17 is connected by a bolt 18 so as to have a limited longitudinal adjustment. At the inner free ends of bars 17 the same are enlarged and made into die heads 19 the adjacent faces of which are properly shaped to engage opposite sides of a saw tooth and shape it when the dies are forced toward each other.

Two screws 20 and 20ᵃ thread through the opposite sides 1ᵇ of the member 1, one of said screws being provided with a right hand thread and the other with a left hand thread. Each at its outer end is formed with a longitudinally ribbed or corrugated head 21 over which the ends of two handle members 22 and 23 pass, a floating block 24 correspondingly ribbed on its inner side bearing against the head 21 and being held thereagainst by set screw 25. The handle member 22 at its outer end has a handle 26 attached thereto and is also formed with a laterally projecting lug 27 which passes through a corresponding slot in the end of member 23, a washer 28 and screw 29 threading into the lug serving to make the connection of member 23 to member 22.

In the swaging of saw teeth such as indicated at 31 on the saw 30, the point of the tooth is upset on its under inclined side and the metal appreciably thickened. This thickness of metal on the different teeth is not uniform. To make the same uniform and to correct any inequalities in the upsetting of the metal, the teeth are successively brought between the die heads 19, the upper edges of the teeth coming below the end 12 of the block 11 and the point of the tooth entering the notch 12ᵃ made in the under side of part 12 as indicated in Fig. 5. When the tooth is entered, the handle may be in upright position or turned to the left of upright position (referring to Fig. 1) thereby moving the screws 20 and 20ᵃ outward and permitting the spreading of the die heads 19. After the tooth is entered the handle is turned until stopped by engagement with the stop member 9. This turns both screws 20 and 20ᵃ inwardly and as a consequence the die heads are forced toward each other and against the sides of the tooth, engaging against the upset metal and forcing it to shape. The heads 19 are guided between the upper sides of brackets 2 and the under side of the body member 1 and may be shaped as desired on their inner sides. The screws 5 do not bear tightly against the sides of the saw so that when one tooth is shaped it is very easy to move the tool with reference to the saw to engage with the succeeding tooth. Block 11 and bar 3 bear against the upper edges of the teeth at each side of the one being shaped and help to properly position the tool on the saw. Inasmuch as the inward movements of the heads 19 are controlled positively by the contact of the handle members with the stop 9, it is evident that each tooth is shaped exactly the same as the other. The connection of the handle members 22 and 23 as described and shown permits their spreading apart at their inner ends as both screws move outward and coming together as the screws move simultaneously inward. The opening at 1ᵃ is a marked advantage as it permits the inspection of the work as it is being done; while the screw actuation of the die heads is one very powerful and effective in operation.

I claim:

A saw tooth shaper comprising a support having an opening downwardly therethrough, two dies movably mounted on the support and positioned below said opening, screws threaded through opposite sides of the support to engage against the dies, said screws being oppositely threaded, a handle member attached to the outer end of each screw, said handle members being brought together at a distance from the screws and one of said members being provided with a slot therethrough, a lug on the other member entering said slot, a washer over the end of the lug and adjacent portions of the first handle member, and a screw threaded into the lug to hold the washer, substantially as described.

In testimony whereof I affix my signature.

JOHN P. HEDSTROM.